(12) United States Patent
Kuratani

(10) Patent No.: US 9,331,612 B2
(45) Date of Patent: May 3, 2016

(54) MOTOR CONTROL APPARATUS

(71) Applicant: Shinichi Kuratani, Aichi (JP)

(72) Inventor: Shinichi Kuratani, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/477,329

(22) Filed: Sep. 4, 2014

(65) Prior Publication Data

US 2015/0061554 A1 Mar. 5, 2015

(30) Foreign Application Priority Data

Sep. 4, 2013 (JP) ................... 2013-183331

(51) Int. Cl.
*H02P 6/00* (2006.01)
*B62D 5/04* (2006.01)
*H02P 6/16* (2016.01)

(52) U.S. Cl.
CPC ................ *H02P 6/002* (2013.01); *B62D 5/046* (2013.01); *H02P 6/16* (2013.01); *H02P 2205/01* (2013.01)

(58) Field of Classification Search
CPC ....................................... H02P 6/002
USPC ................. 318/400.04, 400.01, 700
See application file for complete search history.

(56) References Cited

U.S. PATENT DOCUMENTS

| | | | |
|---|---|---|---|
| 4,905,135 A | 2/1990 | Unehara et al. | |
| 5,874,818 A * | 2/1999 | Schuurman | ....... H02M 7/53873 318/280 |
| 5,880,574 A | 3/1999 | Otsuka et al. | |
| 6,049,474 A | 4/2000 | Platnic | |
| 6,445,155 B1 | 9/2002 | Williams et al. | |
| 6,735,537 B2 | 5/2004 | Liu et al. | |
| 6,914,409 B2 | 7/2005 | Nukushina | |
| 7,308,192 B2 | 12/2007 | Williams et al. | |
| 7,336,047 B2 | 2/2008 | Ueda et al. | |
| 8,228,012 B2 | 7/2012 | Hamasaki et al. | |
| 8,358,098 B2 * | 1/2013 | Skinner | ............... H02M 1/4208 307/98 |
| 8,471,511 B2 * | 6/2013 | Kitagawa | ................ H02P 6/182 236/11 |
| 8,810,052 B2 * | 8/2014 | Kishibata | ............... G05B 19/00 257/706 |
| 2011/0221368 A1 | 9/2011 | Yabuguchi | |

FOREIGN PATENT DOCUMENTS

| | | | |
|---|---|---|---|
| JP | S63-73898 A | 4/1988 |
| JP | 2540140 B2 | 10/1996 |
| JP | 09-191508 A | 7/1997 |
| JP | 10-155278 A | 6/1998 |
| JP | 2001-095279 A | 4/2001 |
| JP | 2002-291284 A | 10/2002 |
| JP | 2005-531270 A | 10/2005 |

(Continued)

*Primary Examiner* — David S Luo
(74) *Attorney, Agent, or Firm* — Osha Liang LLP

(57) ABSTRACT

A motor control apparatus has an inverter circuit having a plurality of pairs of upper and lower arms provided so as to correspond to a number of phases, and switching elements provided on each of the upper arms and the lower arms of each phase that drive a motor on the basis of ON or OFF operations of the respective switching elements, a single current detector that detects a current of the motor flowing through the inverter circuit, and a duty calculator that calculates duties of PWM signals for turning the switching elements ON or OFF on the basis of a deviation between a current value of the current detected by the current detector and a target current value.

17 Claims, 13 Drawing Sheets

(56) References Cited

FOREIGN PATENT DOCUMENTS

| | | |
|---|---|---|
| JP | 2007-112416 A | 5/2007 |
| JP | 2010-279141 A | 12/2010 |
| JP | 2011-193637 A | 9/2011 |
| JP | 4884356 B2 | 2/2012 |

* cited by examiner

| ROTATIONAL ANGLE OF MOTOR | MAXIMUM PHASE | INTERMEDIATE PHASE | MINIMUM PHASE |
|---|---|---|---|
| 30° − 90° | PHASE A | PHASE B | PHASE C |
| 90° − 150° | PHASE A | PHASE C | PHASE B |
| 150° − 210° | PHASE C | PHASE A | PHASE B |
| 210° − 270° | PHASE C | PHASE B | PHASE A |
| 270° − 330° | PHASE B | PHASE C | PHASE A |
| 330° − 360°<br>0° − 30° | PHASE B | PHASE A | PHASE C | ns
MOTOR CONTROL APPARATUS

BACKGROUND OF THE INVENTION

1. Field of the Invention

The present invention relates to a motor control apparatus configured to control a motor on the basis of a PWM (Pulse Width Modulation) system and, more specifically, to a motor control apparatus configured to detect currents in respective phases by using a single current detector.

2. Description of Related Art

For example, an electric power steering apparatus of a vehicle is provided with an electric motor such as a 3-phase brushless motor in order to provide a steering function with a steering auxiliary power in accordance with a steering torque of a steering handle. Examples of the motor control apparatus configured to control rotations of the motor includes a motor control apparatus on the basis of the PWM system (see Japanese Patent No. 4884356, JP-A-2010-279141, JP-A-2007-112416, JP-A-10-155278, JP-T-2005-531270, JP-A-2001-95279, U.S. Pat. No. 6,735,537, Japanese Patent No. 2540140, JP-A-63-73898, JP-A-9-191508, JP-A-2002-291284, and JP-A-2011-193637).

In general, the motor control apparatus on the basis of the PWM system includes an inverter circuit configured to drive a motor on the basis of a PWM signal, a control unit configured to control an operation of the inverter circuit, and a current detection circuit configured to detect motor currents. The inverter circuit includes the same number of pairs of upper and lower arms as the number of phases, and each pair of the upper arm and the lower arm is provided with a switching element. The current detection circuit includes a current detection resistance (hereinafter, referred to as "shunt resistance") configured to detect motor currents in respective phases flowing in the inverter circuit. The control unit generates PWM signals having predetermined duties for the respective switching elements of the inverter circuit on the basis of a deviation between a target value of current to be fed to the motor and a value of the current detected by the shunt resistance, and outputs the generated PWM signals to the inverter circuit. The respective switching elements of the inverter circuit perform ON-OFF operations on the basis of the PWM signals. Accordingly, the current flows from a power source through the inverter circuit to the motor, and hence the motor rotates.

In the case where the shunt resistance configured to detect the motor current is provided on the lower arm for each phase of the inverter circuit, a current in each phase flowing to the motor may be detected as an actual measured value. However, in this case, the same number of shunt resistances as the number of the phases are required, and hence the configuration of a circuit becomes complicated. Therefore, detection of the current in each phase by using a single shunt resistance has been performed in the related art (see Japanese Patent No. 4884356, JP-A-2010-279141, JP-A-2007-112416, JP-T-2005-531270, and JP-A-2002-291284). This system is referred to as "single shunt system", hereinafter. In the single shunt system, currents in two phases flowing through the shunt resistance are detected, and a current in a remaining phase is obtained by an arithmetic operation on the basis of the detected values (detailed description will be given later).

FIG. 11 illustrates an example of the motor control apparatus on the basis of the single shunt system. A motor control apparatus 200 is provided between a power circuit 5 and a motor 6, and includes an inverter circuit 2, a current detection circuit 3, and a control unit 20. The motor 6 is, for example, a 3-phase brushless motor used in an electric power steering apparatus of a vehicle. In order to detect a rotational angle of the motor 6, an angle detector 7 such as a resolver is provided. The power circuit 5 includes a DC power source, a rectifying circuit, and a smoothing circuit.

The inverter circuit 2 includes a 3-phase bridge provided with three pairs of upper and lower arms corresponding to Phase A, Phase B, and Phase C. An upper arm a1 and a lower arm a2 in Phase A have switching elements Q1 and Q2, respectively. An upper arm a3 and a lower arm a4 in Phase B have switching elements Q3 and Q4, respectively. An upper arm a5 and a lower arm a6 of Phase C have switching elements Q5 and Q6, respectively. These switching elements Q1 to Q6 are, for example, composed of FET (field-effect transistors). Hereinafter, the switching element for the upper arm for each phase is referred to as "upper switching element", and the switching element for the lower arm for each phase is referred to as "lower switching element".

The current detection circuit 3 configured to detect currents flowing to the motor 6 includes a shunt resistance Rs and an amplifier circuit 31. The shunt resistance Rs is connected between the inverter circuit 2 and the ground G. The amplifier circuit 31 is configured to amplify a voltage at both ends of the shunt resistance Rs and outputs an amplified voltage to the control unit 20. The control unit 20 calculates duties of the PWM signals in the respective phases on the basis of a deviation between a detected current value calculated from the voltage supplied by the amplifier circuit 31 and a target current value calculated from a steering torque supplied by a torque sensor (not illustrated). The PWM signals (PWM1 to PWM6) in the respective phases generated on the basis of the duties are output to the inverter circuit 2. The switching elements Q1 to Q6 of the inverter circuit 2 perform the ON-OFF operations on the basis of these PWM signals. Accordingly, the current flows from the power circuit 5 through the inverter circuit 2 to the motor 6, and hence the motor 6 rotates. Subsequently, the magnitude and the direction of the current flowing to the motor 6 are controlled in accordance with ON-OFF patterns of the switching elements Q1 to Q6 in accordance with the duties and the phases of the PWM signals.

FIG. 12 to FIG. 15 are explanatory drawings illustrating a principle of motor current detection on the basis of the single shunt system. As illustrated in FIG. 12, PWM signals in the respective phases in accordance with duties of Phase A, Phase B, and Phase C are generated on the basis of sawtooth-like carrier signals. Since a method of generating PWM signals are well known, description will be omitted here. Hereinafter, a phase having a maximum duty is referred to as "maximum phase", a phase having a minimum duty is referred to as "minimum phase", and a phase having an intermediate duty is referred to as "intermediate phase". In FIG. 12, Phase A corresponds to the maximum phase, Phase B corresponds to the minimum phase, and Phase C corresponds to the intermediate phase.

The PWM signals in the respective phases in FIG. 12 represent PWM signals to be supplied to the upper switching elements for the respective phases (PWM1, PWM3, and PWM5 in FIG. 11). The same applies to the drawings to be described below. The PWM signals to be supplied to the lower switching elements of the respective phases (PWM2, PWM4, and PWM 6 in FIG. 11) correspond substantially to signals obtained by inverting the PWM signals in the respective phases from those in FIG. 12. The PWM cycle illustrated in FIG. 12 corresponds to a period from a fall to a next fall of a carrier signal, and one control cycle includes five PWM cycles. One PWM cycle is, for example, 50 µs. In this case, one control cycle is 250 µs. Hatched portions illustrated in FIG. 12 indicate current detection terms for detecting currents flowing to the shunt resistance Rs. The current detection terms are set as predetermined terms until the respective PWM signals in the intermediate phase (Phase C) and the minimum phase (Phase B) rise in the last PWM cycles of the respective control cycles.

FIG. 13 is a drawing illustrating a portion surrounded by an alternate long and short dash line in FIG. 12 in an enlarged scale, added with a waveform of a current flowing through the shunt resistance Rs (shunt current). In FIG. 13, W1 represents a current detection term in which a current in Phase A is to be detected, and W2 represents a current detection term in which a current in Phase B is to be detected.

In the current detection term W1, the PWM signal in Phase A is "H" (High), the PWM signal in Phase B is "L" (Low), and the PWM signal in Phase C is "L". Therefore, as illustrated in FIG. 14, the upper switching elements Q1, Q3, and Q5 are ON, OFF, OFF, respectively, and the lower switching elements Q2, Q4, Q6 are OFF, ON, ON, respectively. Consequently, current routes indicated by broken line arrows in FIG. 14 are formed, and a Phase A current IA flows to the shunt resistance Rs. Voltages generated by the Phase A current IA at both ends of the shunt resistance Rs enter the control unit 20 via the amplifier circuit 31 (FIG. 11), and are A/D converted (analogue-digital conversion) in the control unit 20, whereby the current value IA of the current in Phase A is detected.

In the current detection term W2, the PWM signal in Phase A is "H", the PWM signal in Phase B is "L", and the PWM signal in Phase C is "H". Therefore, as illustrated in FIG. 15, the upper switching elements Q1, Q3, and Q5 are ON, OFF, ON, respectively, and the lower switching elements Q2, Q4, Q6 are OFF, ON, OFF, respectively. Consequently, current routes indicated by broken line arrows in FIG. 15 are formed and Phase B current −IB having an opposite polarity flows to the shunt resistance Rs. Voltages generated by the Phase B current −IB at both ends of the shunt resistance Rs enter the control unit 20 via the amplifier circuit 31 (FIG. 11) and are A/D converted in the control unit 20, so that a current value IB of the B-phase current is detected.

When the current value IA of the Phase A current and the current value TB of the Phase B current are detected, the current value IC of the Phase C current can be obtained by arithmetic operation by using the values IA and IB. In other words, according to Kirchhoff's law, a relationship of IA+IB+IC=0 is established among the current values of the respective phases IA, IB, and IC, so that the current value IC of the Phase C current can be calculated as IC=−(IA+IB).

In order to achieve a normal A/D conversion of the current detected by the shunt resistance Rs in the control unit 20 the current detected by the shunt resistance Rs in the motor control apparatus 200 on the basis of the single shunt system as described above, a current having the constant magnitude needs to flow continuously for a certain period (for example, at least 2 μs) to the shunt resistance Rs. Therefore, intervals of timing at which the switching elements Q1 to Q6 of the inverter circuit 2 are turned ON or OFF may become very short between one phase and another phase depending on the magnitude relationship among duties of the PWM signals in the respective phases. In this state, since currents required for the detection of the current do not flow to the shunt resistance Rs, currents in two phases are not detected, and hence calculation of a current in remaining one phase becomes impossible.

Therefore, a method of shifting the phases of the PWM signals is known for cases where the intervals of timing at which the switching elements are turned ON or OFF is shorter than a threshold value between one phase and another phase is known (see Japanese Patent No. 4884356, JP-A-2010-279141, and U.S. Pat. No. 6,735,537). For example, in FIG. 12, the phase of the Phase C PWM signal in the intermediate phase is shifted backward with respect to the Phase A PWM signal in the maximum phase. The phase of the Phase B PWM signal in the minimum phase is shifted further backward with respect to the phase of the Phase C PWM signal in the intermediate phase. With such phase shifting, the intervals of timing at which the switching elements are turned ON or OFF between one phase and another phase are increased, so that the currents flows to the shunt resistance Rs only for a period required for detecting the current. Consequently, sufficient current detection terms W1 and W2 are secured, and hence the 2-phase current flowing to the motor 6 is accurately detected.

However, if the phases of the PWM signals are suddenly shifted when the control cycle is moved from one control cycle to the next control cycle, an abrupt fluctuation occurs in the motor current instantaneously, which may cause a noise in the motor due to a current ripple. Accordingly, in Japanese Patent No. 4884356, an abrupt current fluctuation is suppressed by shifting the phases of the PWM signals gradually, whereby generation of motor noise is prevented.

FIG. 16 is a drawing illustrating a method of shifting the phases according to Japanese Patent No. 4884356. Here, an example in which the phases of the PWM signals are shifted gradually at a control cycle (n+2) on the basis of current values detected during control cycle (n) will be described.

Currents in two phases are detected in the current detection terms (hatched portions) at the last PWM cycle during control cycle (n), and a current of remaining one phase is detected by an arithmetic operation on the basis of the detected currents. The detected current values in the respective phases are expressed by I(n) inclusively. During the control cycle (n), the rotational angle of the motor 6 is detected by the angle detector 7. Subsequently, the detected current values I(n), the target current values, and the detected rotational angle of the motor are used to calculate duties of the PWM signals in the respective phases. The calculated duties in the respective phases are expressed by D(n) inclusively. Subsequently, the calculated duties in the respective phases are compared and are ranked, so that the maximum phase, the minimum phase, and the intermediate phase of the PWM signals are determined. Then, on which phase, and how much, the shift is to be performed are arithmetically operated in accordance with the magnitude relationship of the duties, whereby phase shift amounts of the respective phases are determined. The determined phase shift amounts of the respective phases are expressed by P(n) inclusively.

The duties D (n−1) and the phase shift amounts P(n−1) of the PWM signals in the control cycle (n+1) are determined by using current values I(n−1) detected during the current detection terms (hatched portions) in the control cycle (n−1), the target current value, and the rotational angle of the motor detected in the control cycle (n−1).

If the duties and the phase shift amounts are determined, generation of the PWM signals is enabled. Therefore, in the control cycle (n+2), PWM signals having a gradually shifting phase are output. Here, the phase of Phase A is shifted gradually forward, and the phase of Phase B is shifted gradually backward. The phase of Phase C is not shifted. As regards Phase A and Phase B, the phase is shifted by ⅕ at every cycle from the PWM cycles #1 to #5, and shifting is completed in the PWM cycle #5 as apparent from the drawings. Consequently, in the PWM cycle #5, the interval of timing at which the PWM signals of the respective phases are turned ON or OFF is increased in the PWM cycle #5, so that the currents in two phases are detected during the current detection terms (hatched portions).

In this manner, by shifting the phases of the PWM signals gradually, the abrupt fluctuation of the motor current is suppressed, so that currents in two phases can be detected while preventing generation of noise caused by the current ripple.

In the phase shifting method illustrated in FIG. 16, the duties D(n) of the PWM signal and the phase shift amounts P(n) of the PWM signals are determined on the basis of the current values I(n) and a rotational angle of the motor detected in the control cycle (n) and a rotational angle of the motor. However, the PWM signals on which these values are reflected are output only in the control cycle (n+2). The reason is that arithmetic processing in the CPU needs a certain period of time, and hence output of the PWM signals cannot be done in a control cycle (n+1). Therefore, a delay of one control cycle or more may occur from the detection of the current or the rotational angle of the motor (hereinafter, referred to as "current or the like") through the determination of the duties and the phase shift amounts until the PWM signals are output. Therefore, the responsiveness of the motor is not good and hence the following capability in the case where the steering handle is turned sharply is not sufficient.

SUMMARY OF THE INVENTION

A motor control apparatus according to one or more embodiments of the present invention has improved motor responsiveness.

The motor control apparatus according to one or more embodiments of the invention includes: an inverter circuit having a plurality of pairs of upper and lower arms provided so as to correspond to the number of phases and switching elements provided on each of the upper arms and the lower arms of each phase and being configured to drive a motor on the basis of ON or OFF operations of the respective switching elements; a single current detector configured to detect a current of the motor flowing through the inverter circuit: a duty calculator configured to calculate duties of PWM signals for turning the switching elements ON or OFF on the basis of a deviation between a current value of the current detected by the current detector and a target current value; a PWM signal generator configured to generate a plurality of PWM signals corresponding to a plurality of PWM cycles for respective phases within one control cycle including the plurality of PWM cycles on the basis of duties calculated by the duty calculator, and output the PWM signals to the switching elements respectively; and a phase shift unit configured to shift the phases of the PWM signals generated by the PWM signal generator gradually within one control cycle. The PWM signal generator generates and outputs PWM signals having calculated duties after the duty calculator calculates the duties of the PWM signals in the respective phases before the phase shift unit starts phase shifting.

In this configuration, after the duties have calculated before phase shifting is started, the PWM signals having the corresponding duties are output, so that the duties of the PWM signals are switched at the timing earlier than that of the related art. Therefore, responsiveness of the motor is improved, and a sufficient following capability is delivered even when a steering wheel is turned sharply.

Preferably, the PWM signal generator generates and outputs PWM signals having calculated duties in a n+1th control cycle after the duty calculator calculates the duties of the PWM signals in the respective phases on the basis of a current detected by the current detector in a nth control cycle, and the phase shift unit shifts the phases of the PWM signals gradually in a n+2th control cycle.

Preferably, the phase shift unit calculates phase shift amounts in the respective phases in the last PWM cycle in the n+2th control cycle on the basis of a result of ranking of the duties in the respective phases in a predetermined PWM cycle in the n+2th control cycle calculated by the duty calculator, and shifts the phases of the PWM signals gradually in the n+2th control cycle on the basis of the phase shift amounts.

Preferably, a rotational angle detector configured to detect a rotational angle of the motor is further provided, and the phase shift unit calculates the phase shift amounts of the respective phases in the last PWM cycle in the n+2th control cycle on the basis of a relationship between the rotational angle of the motor acquired from the rotational angle detector and the duties in the respective phases, and shifts the phases of the PWM signals gradually in the n+2th control cycle on the basis of the phase shift amounts.

Preferably, a rotational angle detector configured to detect a rotational angle of the motor is provided, and the phase shift unit operates an estimated value of the rotational angle of the motor in the last PWM cycle in the n+2th control cycle on the basis of the rotational angle of the motor acquired from the rotational angle detector, calculates the phase shift amounts in the respective phases in the last PWM cycle in the n+2th control cycle on the basis of a relationship between the estimated value of the rotational angle and the duties in the respective phases, and shifts the phases of the PWM signals gradually in the n+2th control cycle on the basis of the phase shift amounts.

Preferably, a rotational angle detector configured to detect a rotational angle of the motor is further provided, and the phase shift unit operates an estimated value of the rotational angle of the motor in the last PWM cycle in the n+2th control cycle on the basis of the rotational angle of the motor acquired from the rotational angle detector, operates estimated values of the duties in the respective phases in the last PWM cycle in the n+2th control cycle on the basis of the estimated value of the rotational angle, calculates the phase shift amounts in the respective phases in the last PWM cycle in the n+2th control cycle on the basis of a result of ranking of the estimated values of the duties in the respective phases, and shifts the phases of the PWM signals gradually in the n+2th control cycle on the basis of the phase shift amounts.

Preferably, the PWM signal generator generates and outputs PWM signals having duties calculated by the duty calculator in the n+1th control cycle before the current detector detects the currents.

Preferably, the PWM signal generator generates and outputs PWM signals having duties calculated by the duty calculator immediately after the calculation of the duties in the n+1th control cycle.

Preferably, the PWM signal generator generates and outputs PWM signals having calculated duties in a n+1th control cycle after the duty calculator calculates the duties of the PWM signals in the respective phases on the basis of the current detected by the current detector before the current detector detects the currents in the nth control cycle, and the phase shift unit shifts the phases of the PWM signals gradually from immediately after the current detector detects the currents in a n+1th control cycle.

According to one or more embodiments of the invention, a motor control apparatus in which responsiveness of a motor is improved is provided.

DETAILED DESCRIPTION

Figure 1:
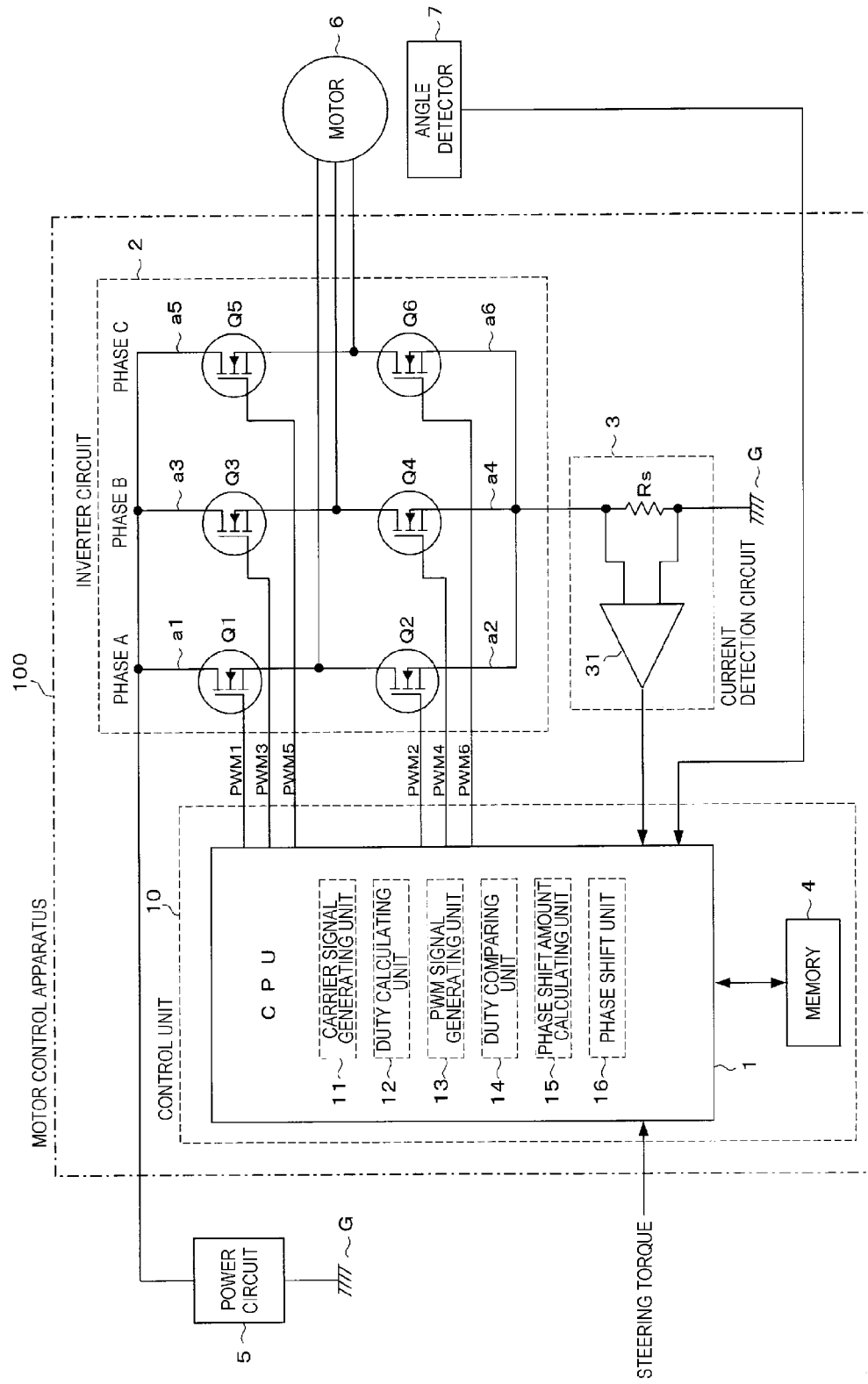
FIG. 1 is a circuit diagram of a motor control apparatus according to one or more embodiments of the invention.

Embodiments of the invention will be described below with reference to the drawings. In the drawings, similar or corresponding components are denoted by the same reference signs. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 11:
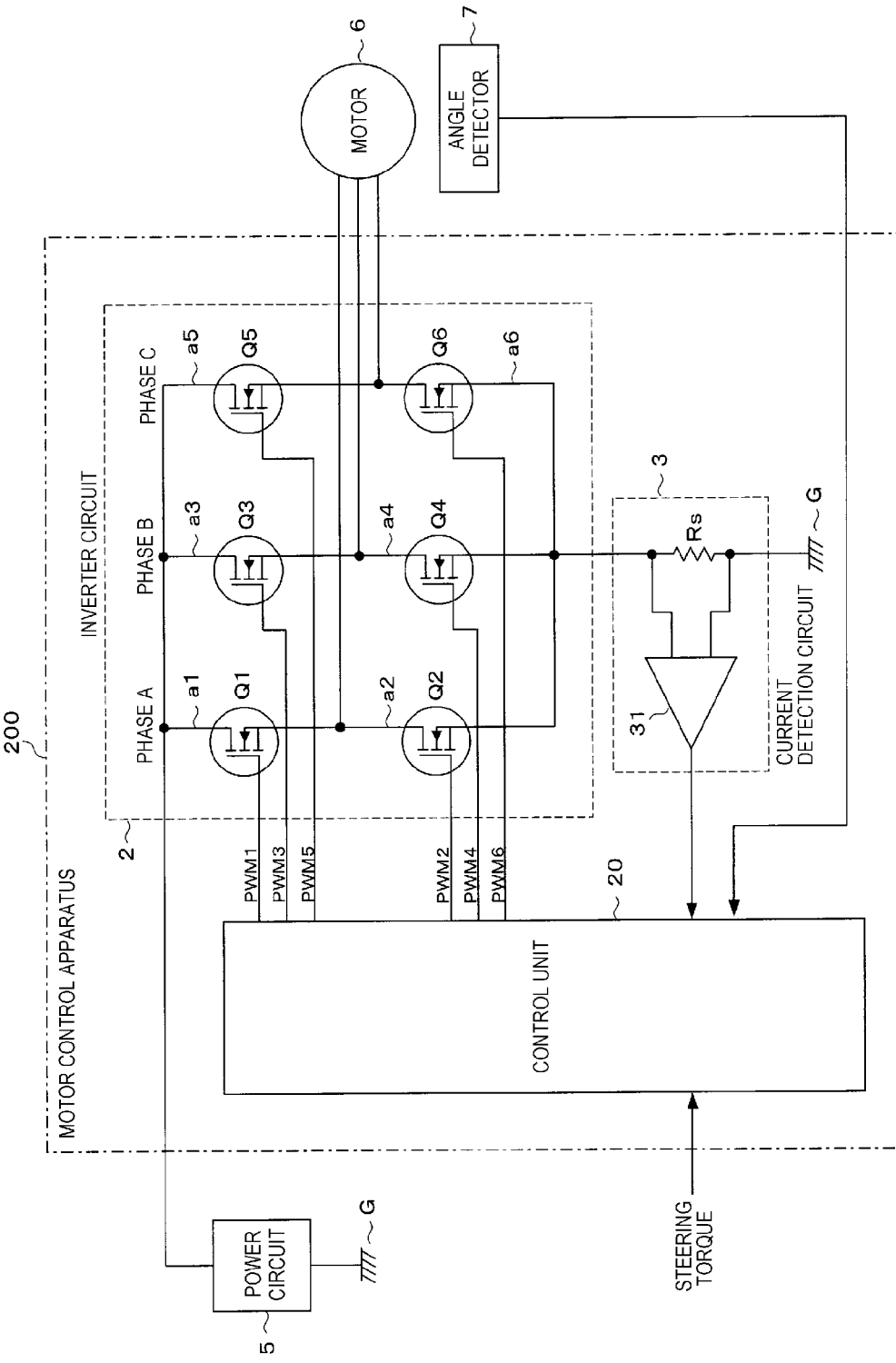
FIG. 11 is a circuit diagram illustrating an example of the motor control apparatus on the basis of a single shunt system.

First of all, referring to FIG. 1, a configuration of a motor control apparatus will be described. A motor control apparatus 100 is provided between a power circuit 5 and a motor 6, and includes an inverter circuit 2, a current detection circuit 3, and a control unit 10. The motor 6 is, for example, a 3-phase brushless motor used in an electric power steering apparatus of a vehicle. In order to detect a rotational angle of the motor 6, an angle detector 7 such as a resolver is provided. A configuration of the motor control apparatus 100 illustrated in FIG. 1 is basically the same as the configuration of the motor control apparatus 200 illustrated in FIG. 11. However, the function of the control unit 10 is different from the function of the control unit 20 in FIG. 11 (detailed description will be given later).

The control unit 10 includes a CPU 1 and a memory 4. The CPU 1 includes a carrier signal generating unit 11, a duty calculating unit 12 a PWM signal generating unit 13, a duty comparing unit 14, a phase shift amount calculating unit 15, and a phase shift unit 16. The memory 4 includes ROM and RAM. Since the inverter circuit 2, the current detection circuit 3, and the power circuit 5 are the same as those described in conjunction with FIG. 11, description of these components will be omitted.

Figure 2:
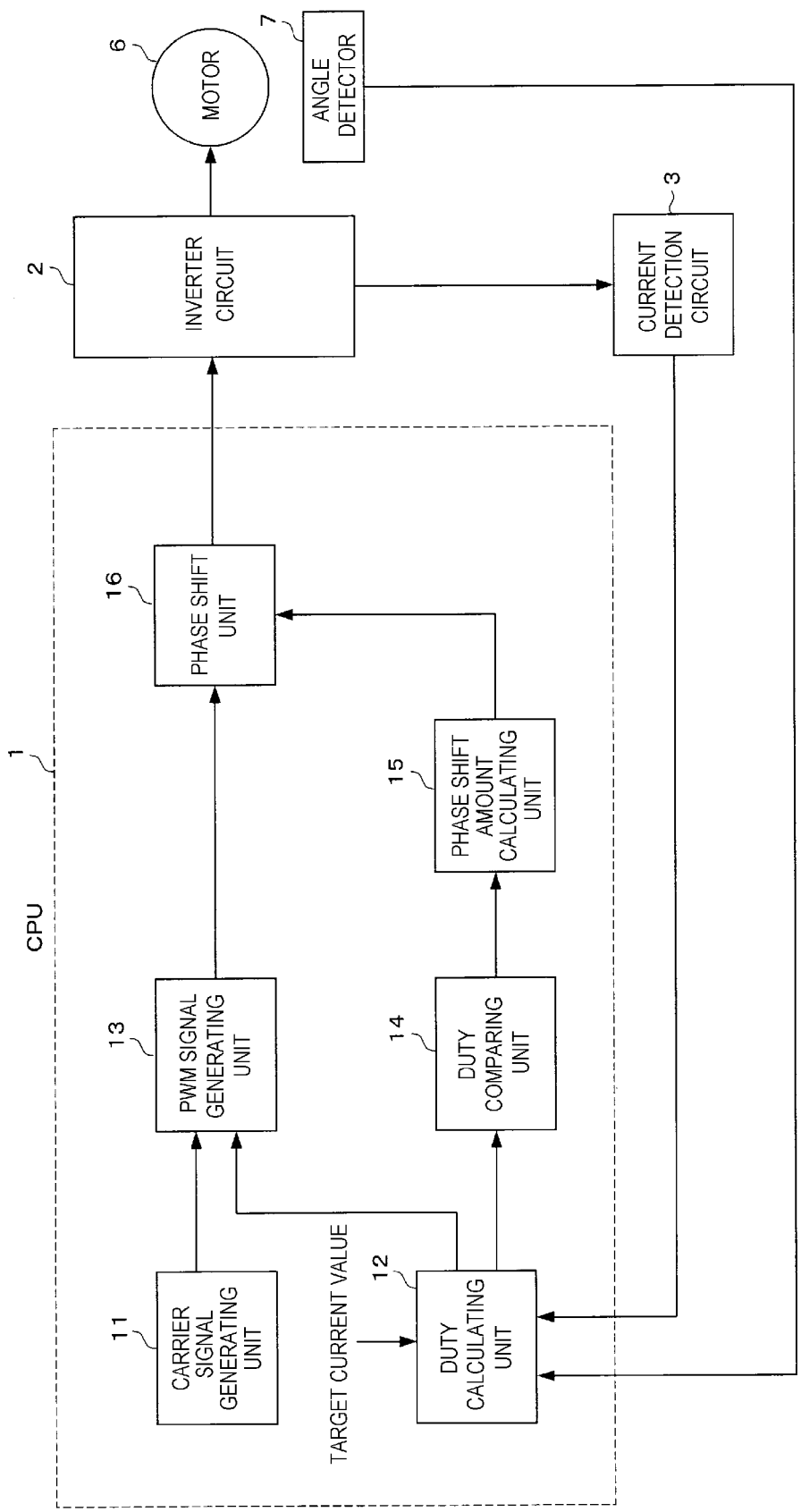
FIG. 2 is a block diagram illustrating a mutual relationship of respective components of a CPU.

FIG. 2 is a block diagram illustrating a mutual relationship among respective components 11 to 16 of the CPU 1. Actually, functions of these components 11 to 16 are implemented by software.

Figure 12:
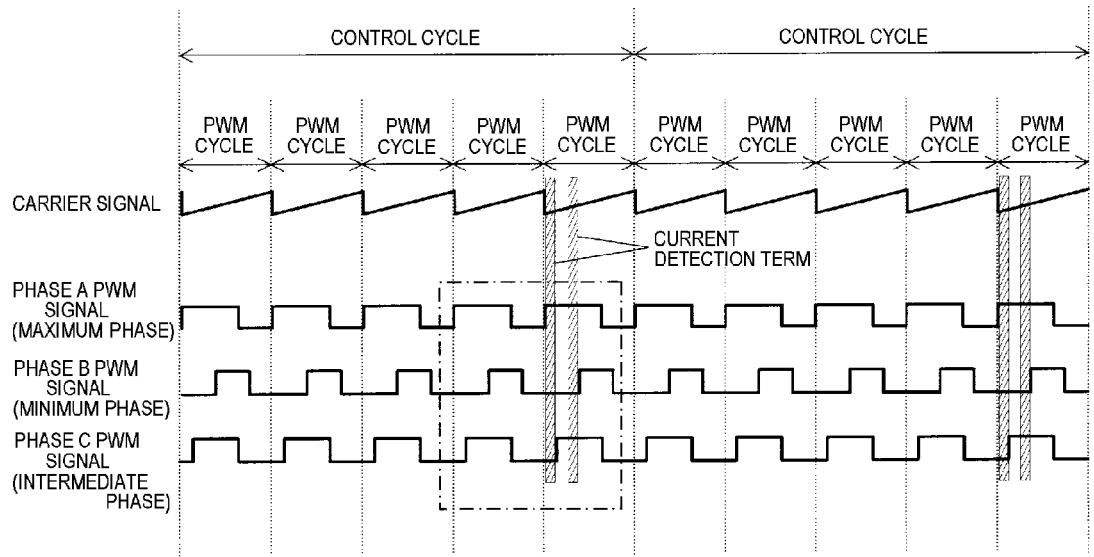
FIG. 12 is a timing chart illustrating a carrier signal and PWM signals in respective phases.
Figure 13:
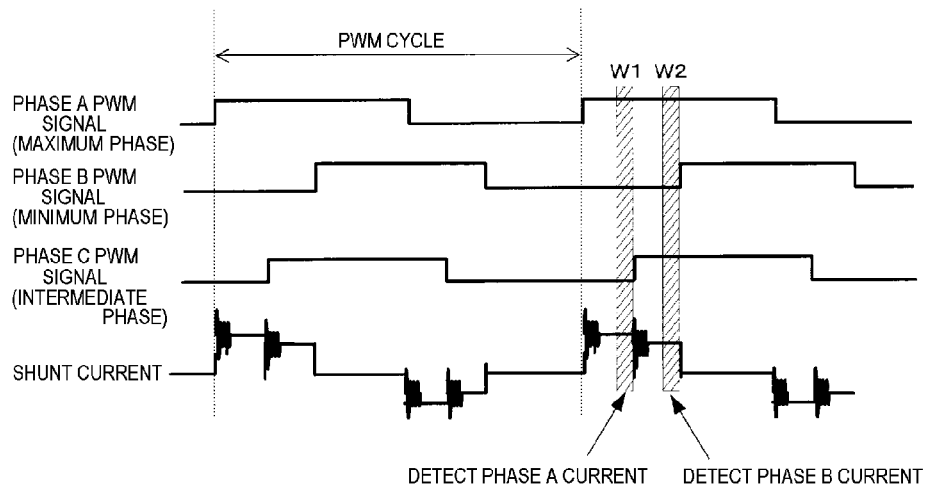
FIG. 13 is an enlarged drawing illustrating a portion surrounded by an alternate long and short dash line in FIG. 12.
Figure 14:
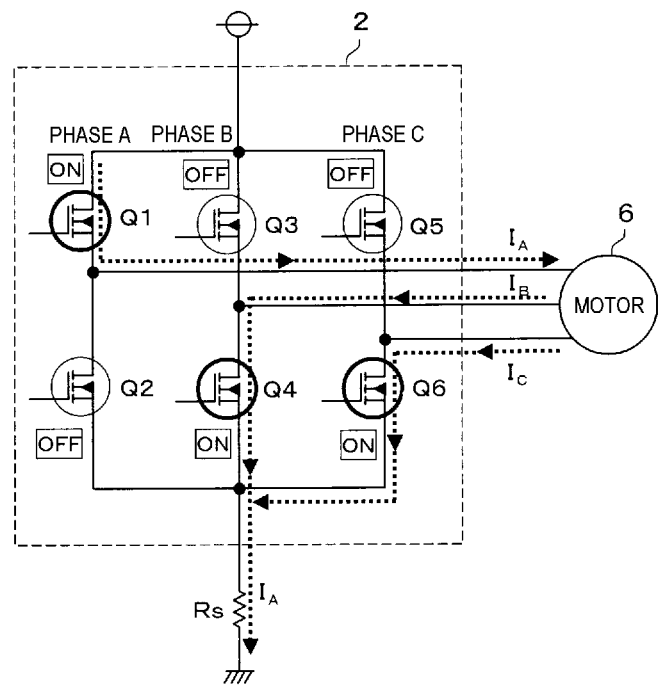
FIG. 14 is a drawing illustrating current routes of an inverter circuit in a current detection term W1.
Figure 15:
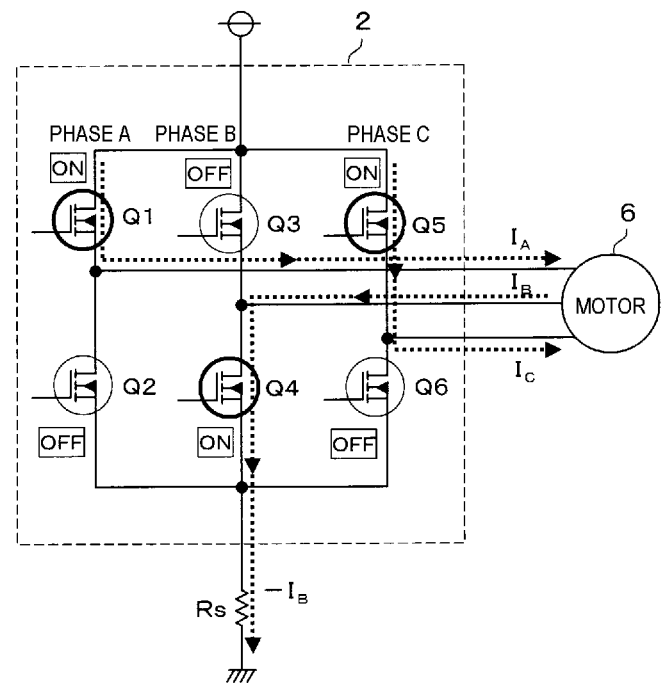
FIG. 15 is a drawing illustrating current routes of an inverter circuit in a current detection term W2.

The carrier signal generating unit 11 generates a sawtooth-shaped carrier signal illustrated in FIG. 12. The duty calculating unit 12 is configured to calculated duties of the PWM signals in the respective phases on the basis of a deviation between a current value of a motor current detected by the current detection circuit 3 and a target current value calculated by a steering torque supplied by a torque sensor (not illustrated), and the rotational angle of the motor 6 supplied by the angle detector 7. The PWM signal generating unit 13 generates the PWM signals (PWM1 to PWM6 in FIG. 1) in the respective phases on the basis of the carrier signal generated by the carrier signal generating unit 11 and the duties calculated by the duty calculating unit 12, and outputs the generated PMW signals to the inverter circuit 2 via the phase moving unit 16.

The duty comparing unit 14 compares the duties in the respective phases calculated by the duty calculating unit 12, and determines a maximum phase having a maximum duty, a minimum phase having a minimum duty, and an intermediate phase having an intermediate duty. In other words, the duties of the respective phases are ranked in terms of magnitude. The phase shift amount calculating unit 15 calculates phase shift amounts on the basis of the result of ranking in the duty comparing unit 14. The phase shift unit 16 shifts the phases of the PWM signals generated by the PWM signal generating unit 13 on the basis of the phase shift amounts calculated by the phase shift amount calculating unit 15.

In the configuration described above, the shunt resistance Rs is an example of "current detector" of one or more embodiments of the invention. The duty calculating unit 12 is an example of "duty calculator" of one or more embodiments of the invention. The PWM signal generating unit 13 is an example of "PWM signal generator" of one or more embodiments of the invention. The duty comparing unit 14, the phase shift amount calculating unit 15, and the phase moving unit 16 are an example of "phase shift unit" of one or more embodiments of the invention. The rotation detector 7 is an example of "rotational angle detector" of one or more embodiments of the invention.

Figure 3:
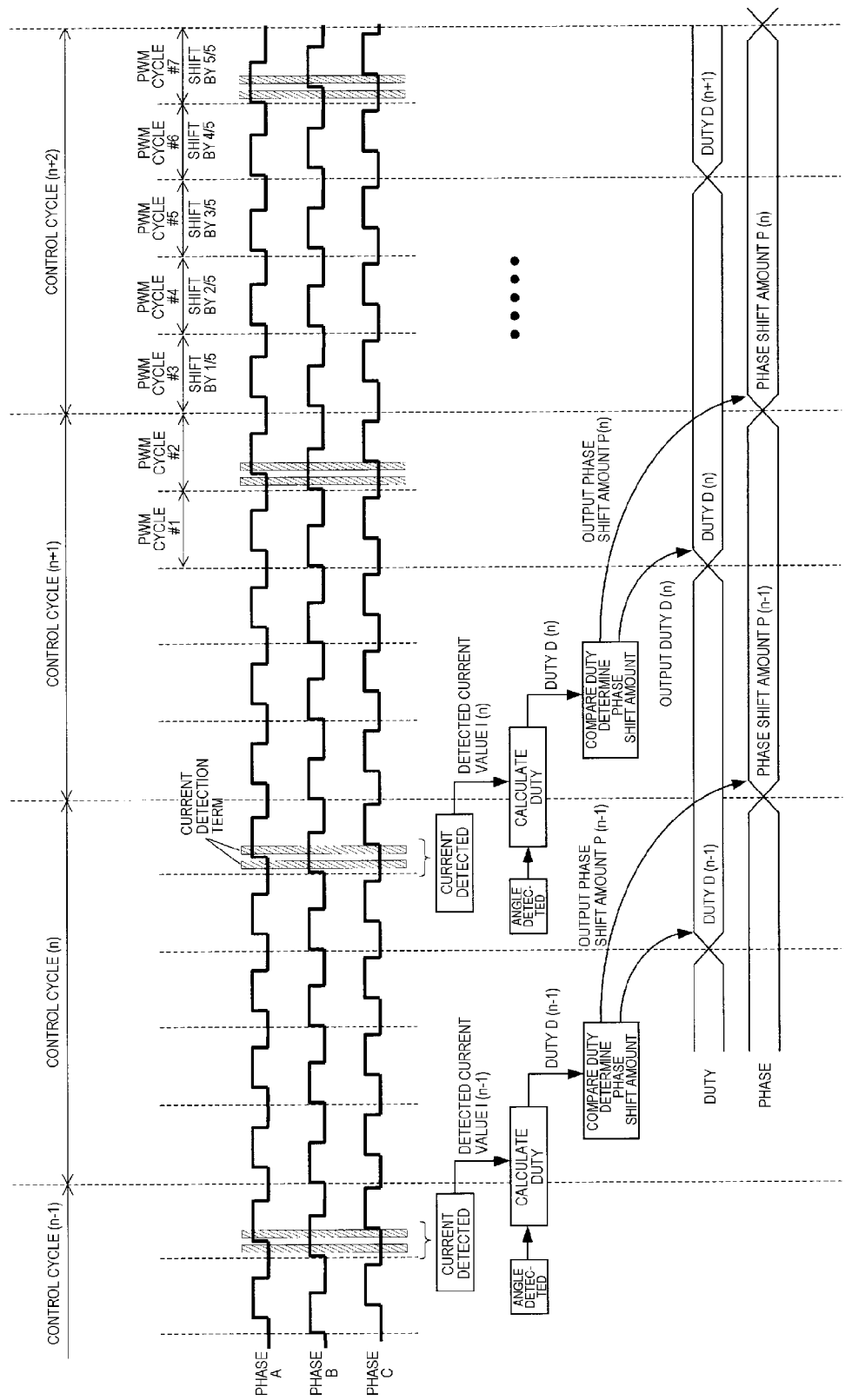
FIG. 3 is a timing chart for explaining a principle of one or more embodiments of the invention.
Figure 16:
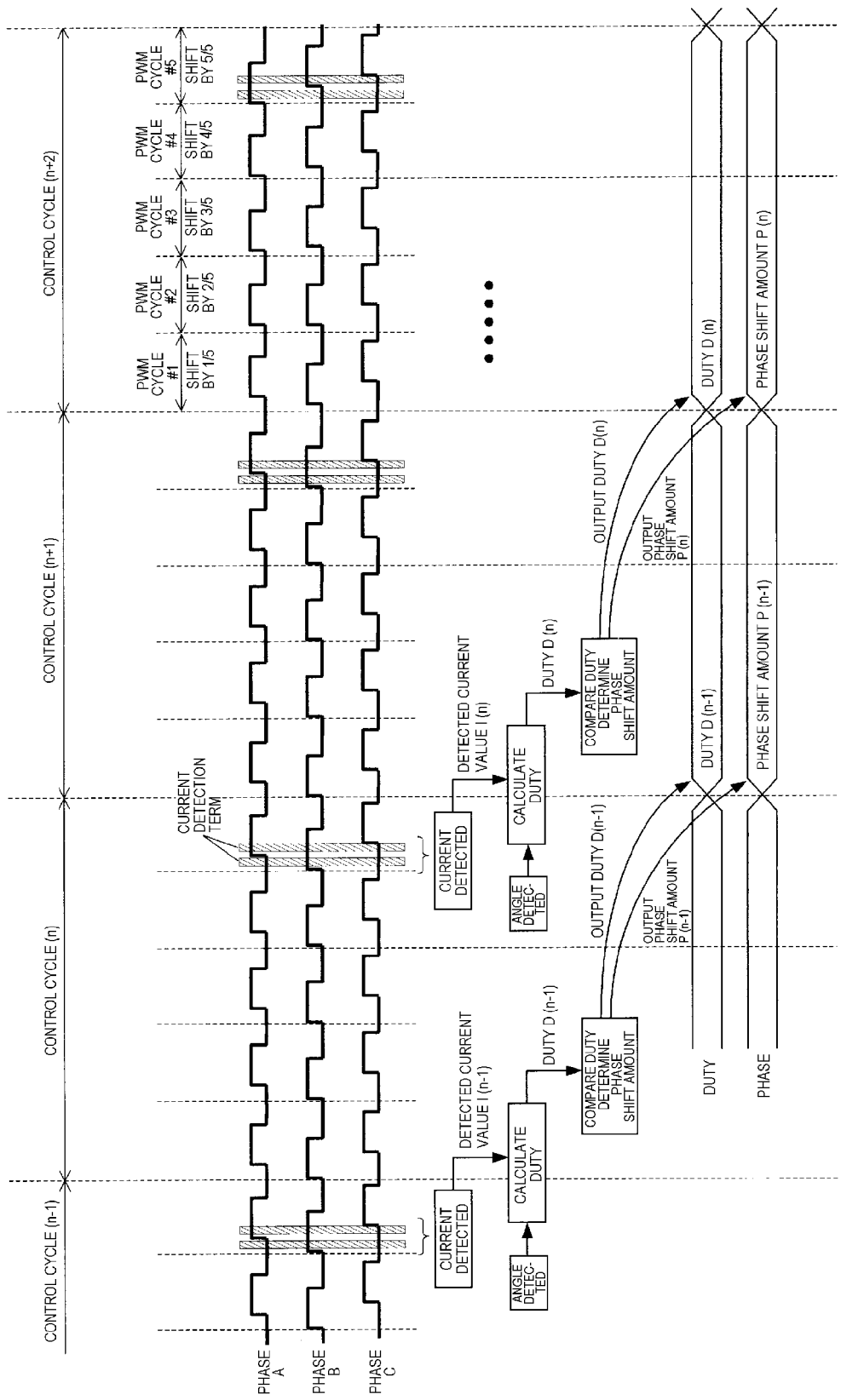
FIG. 16 is a timing chart for explaining a phase shift system of the related art.

Referring now to FIG. 3, a basic principle of one or more embodiments of the invention will be described. FIG. 3 corresponds to FIG. 16, and the same reference signs as in FIG. 16 are used. Here, in the same manner as in FIG. 16, an example in which the phases of the PWM signals are shifted gradually at a control cycle (n+2) on the basis of current values detected in control cycle (n) will be described. FIG. 3 is different from FIG. 16 in timing of outputting a PWM signals having a calculated duties D(n).

In the case of FIG. 16, a PWM signals having the duties D(n) and phase shift amounts P(n) determined on the basis of a current values I(n) and the rotational angle of the motor detected in the control cycle (n) are output in the control cycle (n+2). In other words, the duties D(n) and the phase shift amounts P(n) are reflected on the PWM signals in the control cycle (n+2). In contrast, in the case of FIG. 3, a PWM signals having the duties D(n) determined on the basis of the current value I(n) and the rotational angle of the motor detected in the control cycle (n) are output in the control cycle (n+1). In other words, the duties D(n) are reflected on the PWM signals in the control cycle (n+1). In contrast, the PWM signals having the phase shift amounts P(n) are output in the control cycle (n+2) in the same manner as in FIG. 16. In other words, the phase shift amounts P(n) are reflected on the PWM signals in the control cycle (n+2) Consequently, in FIG. 3, the timing at which the duties D(n) are reflected on the PWM signals goes ahead of the timing at which the phase shift amounts P(n) are reflected on the PWM signals. Further detailed description will be given below.

In FIG. 3, currents in two phases flowing through the shunt resistance Rs are detected during the current detection terms (hatched portions) of the last PWM cycle in the control cycle (n). The current in remaining one phase is detected by an arithmetic operation as described above. The detected current values in the respective phases are expressed by I(n) inclusively. During the control cycle (n), the rotational angle of the motor 6 is detected by the angle detector 7. Then duties of the PWM signals in the respective phases are calculated by the duty calculating unit 12 by using the detected current values I(n), the target current values, and the detected rotational angle of the motor. The calculated duties in the respective phases are expressed by D(n) inclusively. The PWM signal generating unit 13 generates a PWM signal having the calculated duties D(n) and outputs the same after the duty calculating unit 12 calculates the duties D(n) until the phase shift unit 16 starts phase shifting in the control cycle (n+2). Output of the PWM signals is preferably performed before the currents are detected during the current detection terms (hatched portions) in the control cycle (n+1), and is further preferably performed immediately after the calculation of the duties D(n).

Accordingly, the PWM signals having the duties D(n) in the PWM cycles #1 and #2 in the control cycle (n+2) in FIG. 16 comes in ahead in the control cycle (n+1) as illustrated in FIG. 3. In other words, the duties of the PWM signals are switched from D(n−1) to D(n) at the earlier timing than the case of FIG. 16. In one or more embodiments of the invention, since the output of the duties is separated from the output of the phase shift amounts, the calculated duties D(n) are reflected quickly on the control cycle (n+1) even when considering the process time of the CPU 1.

However, the phase shift amounts of the PWM signals having the PWM cycles #1 and #2 become a phase shift amounts P(n−1) determined on the basis of the current values I(n−1) and the rotational angle of the motor detected in the control cycle (n−1). The reason is that since the current needs to be detected in the PWM cycle #2, if the phases are fluctuated before, the current detection term in the PWM cycle #2 may not be secured sufficiently.

In contrast, the process of shifting the phase of the PWM signals gradually by the phase shift unit 16 is started after the entry into the control cycle (n+2) on the basis of the phase shift amounts P(n) calculated by the phase shift amount calculating unit 15. This point is the same as FIG. 16. In the control cycle (n+2), however, only the phase shift amounts in PWM cycles #3 to #5 are fixed on the basis of detection of the current or the like in the control cycle (n). The phase shift amounts in the PWM cycles #6 and #7 are not fixed because these amounts are calculated on the basis of detection of the current or the like in the control cycle (n+1).

Here, the respective phase shift amounts in the PWM cycles #3 to #7 are calculated by dividing the difference between the phase shift amounts in the PWM cycle #7 and the phase shift amounts in the PWM cycle #2 equally by 5. Since the phase shift amounts in the PWM cycle #2 are already fixed on the basis of the detection of the current or the like in the control cycle (n−1), the phase shift amounts in the PWM cycle #7 needs to be determined by any method. Accordingly, in one or more embodiments, the phase shift amounts in the PWM cycle #7 are fixed on the basis of duties in the PWM cycle #5, which is closest to the PWM cycle #7 from among the PWM cycles #1 to #5 having determined duties, as a first method. In other words, the maximum phase, the intermediate phase, and the minimum phase are determined by comparing the magnitudes of the duties in the respective phases in the PWM cycle #5. Then, according to the result, the phase shift amounts in the respective phases in the PWM cycle #7 are determined. For example, the phase shift amount is determined to 0μs (not shifted) for the maximum phase, the phase shift amount is fixed to 6 μs for the intermediate phase, and the phase shift amount is fixed to 12 μs for the minimum phase.

As described thus far, in one or more embodiments, the PWM signal generating unit 13 generates the PWM signals having the duties D(n) and outputs the same after the duty calculating unit 12 calculates the duties D(n) on the basis of detection of the current or the like in the control cycle (n) until shifting of the phases is started in the control cycle (n+2). Consequently, the duties of the PWM signals can be switched at the earlier timing than the related art, and hence the responsiveness of the motor 6 is improved, and hence a sufficient following capability is delivered even when the steering wheel is turned sharply.

In the PWM cycle #7 in FIG. 3, the duties D(n+1) are determined on the basis of detection of the current or the like in the control cycle (n+1), and the phase shift amounts P(n) are determined on the basis of detection of the current or the like in the control cycle (n) Therefore, although the magnitude relationship of the duties and the phase shift amounts in the PWM cycle #7 do not necessarily correspond to each other, the fact remains that the sufficient current detection term can be secured by phase shifting, and hence detection of the motor current is improved.

Figure 4:
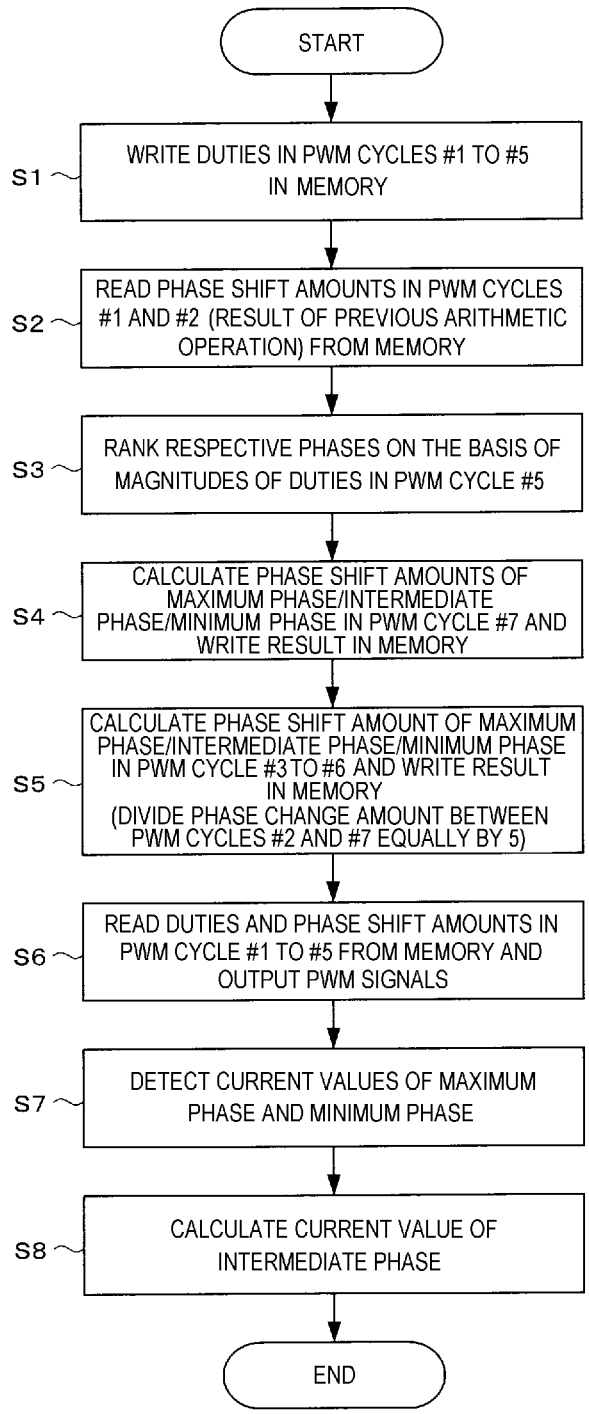
FIG. 4 is a flowchart illustrating a procedure of phase shifting.

FIG. 4 is a flowchart illustrating a process that the CPU 1 executes in the phase shifting described in conjunction with FIG. 3. A series of procedures in this flowchart is repeatedly executed at every control cycle. The process in the control cycle (n+1) will be described below.

In Step S1, the duties in the respective phases in PWM cycles #1 to #5 are calculated on the basis of the current value and the rotational angle of the motor detected in the control cycle 8n), and the calculated duties are written in the memory 4. In other words, the duties in PWM cycles #1 to #5 are set.

In Step S2, the phase shift amounts in the respective phases in the PWM cycles #1 and #2 are read from the memory 4. The phase shift amounts are already calculated in the control cycle (n) on the basis of detection of the current or the like in the control cycle (n−1) and is stored in the memory 4.

In Step S3, the magnitudes of the duties in the respective phases in the PWM cycle #5 are compared to rank the duties. In other words, the maximum phase, the intermediate phase, and the minimum phase are determined.

In Step S4, the phase shift amounts in the maximum phase, the intermediate phase, and the minimum phase in the PWM cycle #7 are calculated from the result of ranking in Step S3, and the calculated phase shift amounts are written in the memory 4. In other words, the phase shift amounts in the PWM cycle #7 are set.

In Step S5, the phase change amounts in the maximum phase, the intermediate phase, and the minimum phase in the PWM cycles #3 to #6 are calculated by dividing the phase change amounts between the PWM cycles #2 and #7 equally by 5, and the calculated phase shift amounts are written in the memory 4.

In Step S6, the duties and the phase shift amounts in PWM cycles #1 to #5 are read from the memory 4 and the PWM signals are generated and output.

In Step S7, the values of currents in the maximum phase and the minimum phase flowing through the shunt resistance Rs are detected in the current detection term in the last PWM cycle in the control cycle (n+1).

In Step S8, by using the current values in two phases detected in Step S7, the current value of the remaining intermediate phase is obtained by an arithmetic operation.

In one or more of the above-described embodiments, the first method of determining the phase shift amounts in the PWM cycle #7 on the basis of the result of ranking of the duties in the PWM cycle #5 is employed. However, there are other methods of fixing the phase shift amounts in the PWM cycle #7.

First of all, as a second method, there is a method of determining the phase shift amounts in the PWM cycle #7 on the basis of the rotational angle of the motor 6 in the PWM cycle #5.

Figures 5, 6:
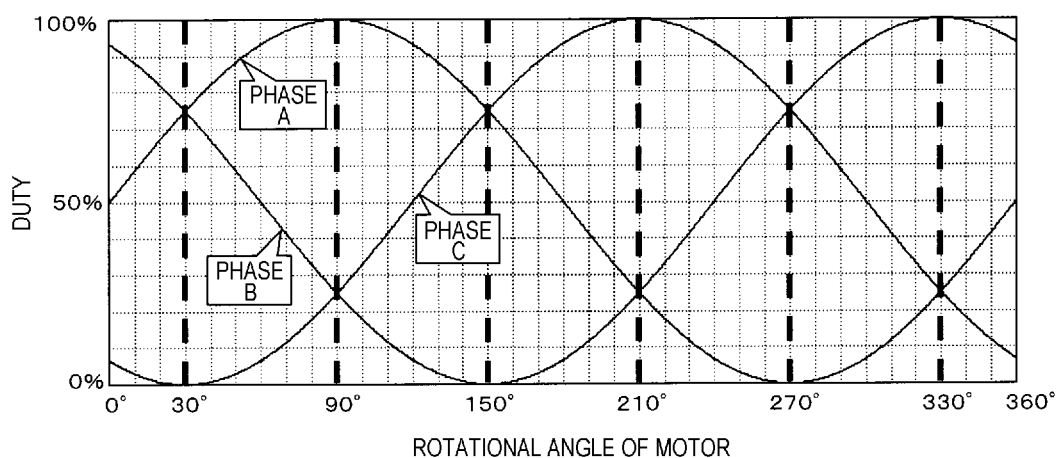
FIG. 5 is a drawing illustrating a relationship between the rotational angle of a motor and the duty.
FIG. 6 is a table illustrating a relationship of the rotational angle of the motor with respect to a maximum phase, an intermediate phase, and a minimum phase.

FIG. 5 illustrates the relationship between the rotational angle of the motor and the duty in the case of a general sinusoidal wave driving. As it is understood from the description given above, the magnitude relationship of the duties in Phase A, Phase B, and Phase C are switched at every 60 degrees. The maximum phase, the minimum phase, and the intermediate phase are uniquely determined corresponding to the rotational angle of the motor. FIG. 6 is a table illustrating a relationship of the rotational angle of the motor with respect to the maximum phase, the minimum phase and the intermediate phase. This table is stored in the memory 4 in advance. Therefore, by referencing the table in FIG. 6 for the rotational angle of the motor 6 acquired from the angle detector 7, the maximum phase, the intermediate phase, and the minimum phase are determined, so that ranking of the duties is enabled. Consequently, the phase shift amounts may be determined on the basis of the ranking.

Figure 7:
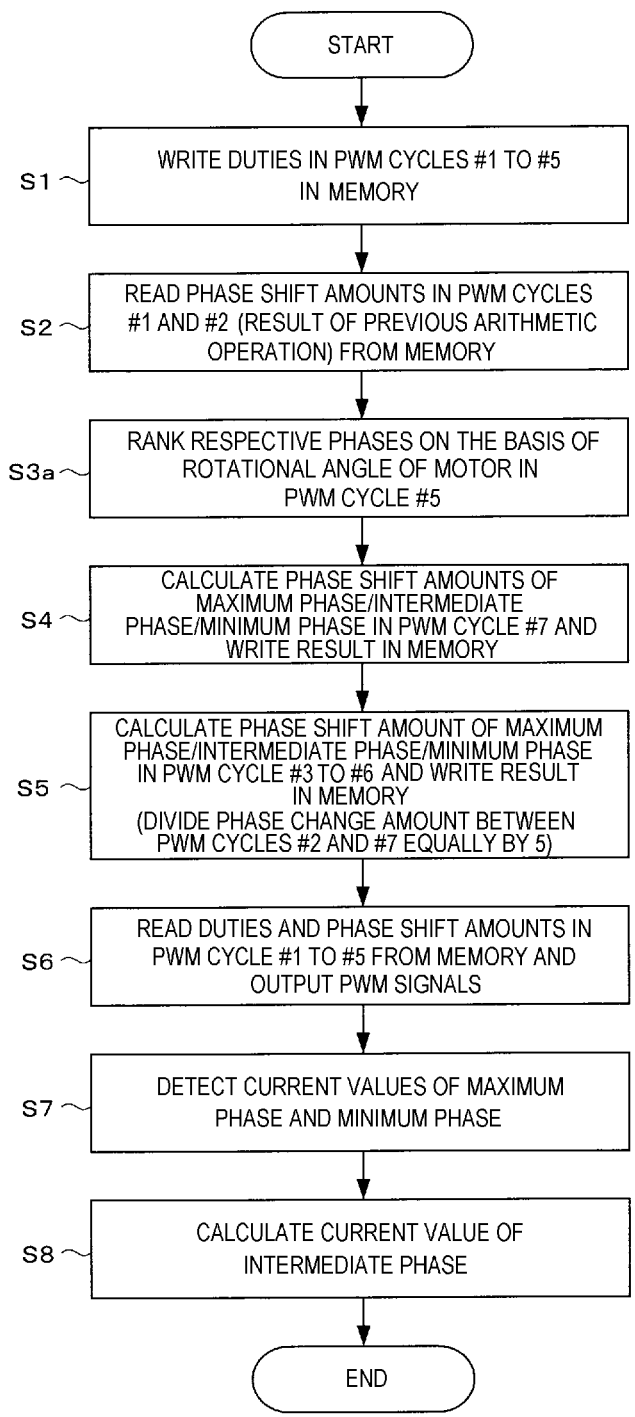
FIG. 7 is a flowchart illustrating another example of phase shifting.

FIG. 7 is a flowchart illustrating a procedure of phase shifting in a case where the second method described above is employed. In FIG. 7, Step S3 in FIG. 4 is replaced by the Step S3a. In Step S3a, the maximum phase, the intermediate phase, and the minimum phase are determined from the table in FIG. 6 for the rotational angle of the motor 6 acquired from the angle detector 7 in the control cycle (n), and ranking of the duties in the PWM cycle #5 is performed. In Step S4, the phase shift amounts in the maximum phase, the intermediate phase, and the minimum phase in the PWM cycle #7 are calculated from the result of the ranking in Step S3a, and the respective phase shift amounts are written in the memory 4. Since Steps S1 to S2, and S5 to S8 are the same as the case in FIG. 4, description will be omitted.

Subsequently, as a third method, there is a method of estimating the rotational angle of the motor in the PWM cycle #7 and determining the phase shift amounts in the PWM cycle #7 on the basis of the estimated value.

Figure 8:
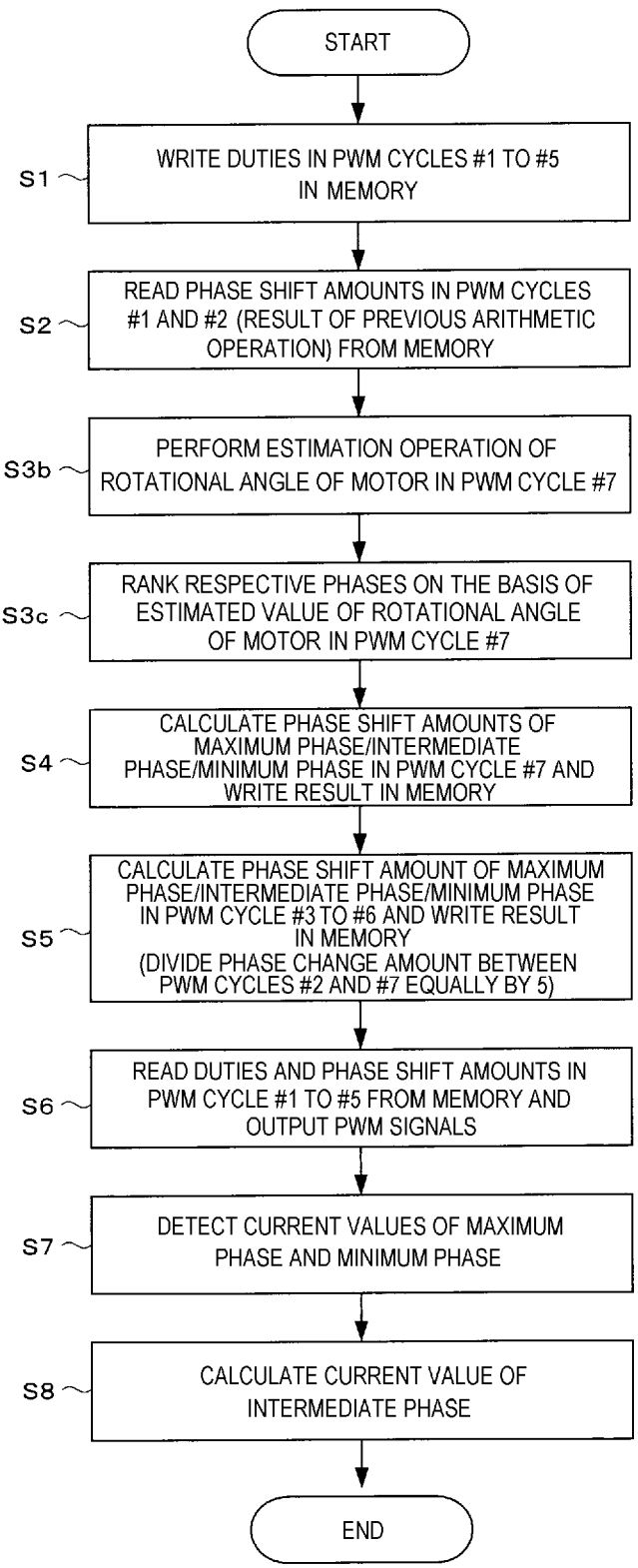
FIG. 8 is a flowchart illustrating still another example of phase shifting.
Figure 10:
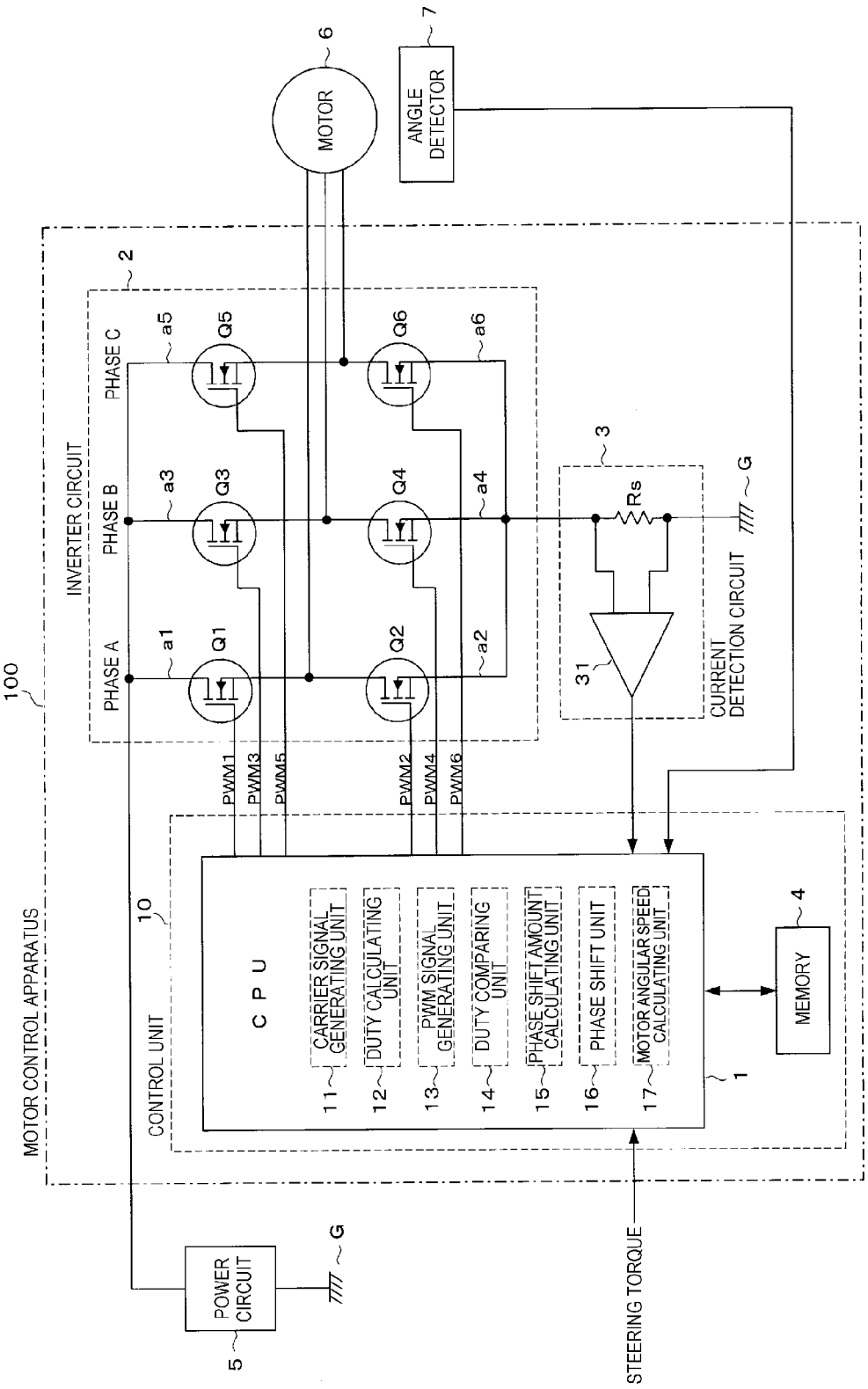
FIG. 10 is a circuit diagram illustrating another example of a motor control apparatus.

FIG. 8 is a flowchart illustrating a procedure of phase shifting in the case where the third method is employed. In FIG. 8, Step S3 in FIG. 4 is replaced by Step S3b and Step S3c. In Step S3b, an estimation operation of the rotational angle of the motor 6 in the PWM cycle #7 is performed. Specifically, with reference to the rotational angle of the motor in the PWM cycle #5, an estimated value of the rotational angle of the motor in the PWM cycle #7 which is two cycles ahead is obtained by the following arithmetic expression. Estimated Value of motor angular speed in PWM cycle #7=rotational angle of the motor in PWM cycle #5+(motor angular speed×PWM cycle time×2) The rotational angle of the motor of the PWM cycle #5 is acquired from the angle detector 7 in the control cycle (n) in the same manner as the case of the second method. The motor angular speed can be calculated from the amount of change of the rotational angle of the motor per unit time. Therefore, in the third method, a motor angle speed calculating unit 17 is provided in CPU 1 (the same applies to a fourth method described later) as illustrated in FIG. 10.

In Step S3c the maximum phase, the intermediate phase, and the minimum phase are determined from the table in FIG. 6 for the rotational angle of the motor (estimated value) in the PWM cycle #7 calculated in Step S3b, and ranking of the duty in the PWM cycle #7 is performed. In Step S4, the phase shift amounts in the maximum phase, the intermediate phase, and the minimum phase in the PWM cycle #7 are calculated from the result of the ranking in Step S3c, and the respective phase shift amounts are written in the memory 4. Since Steps S1 to S2, and S5 to S8 are the same as the case in FIG. 4, description will be omitted.

Finally, as the fourth method, there is a method of estimating the duties in the PWM cycle #7 on the basis of the rotational angle of the motor (estimated value) in the PWM cycle #7, and determining the phase shift amounts in the #7 on the basis of the result of ranking of the duties.

Figure 9:
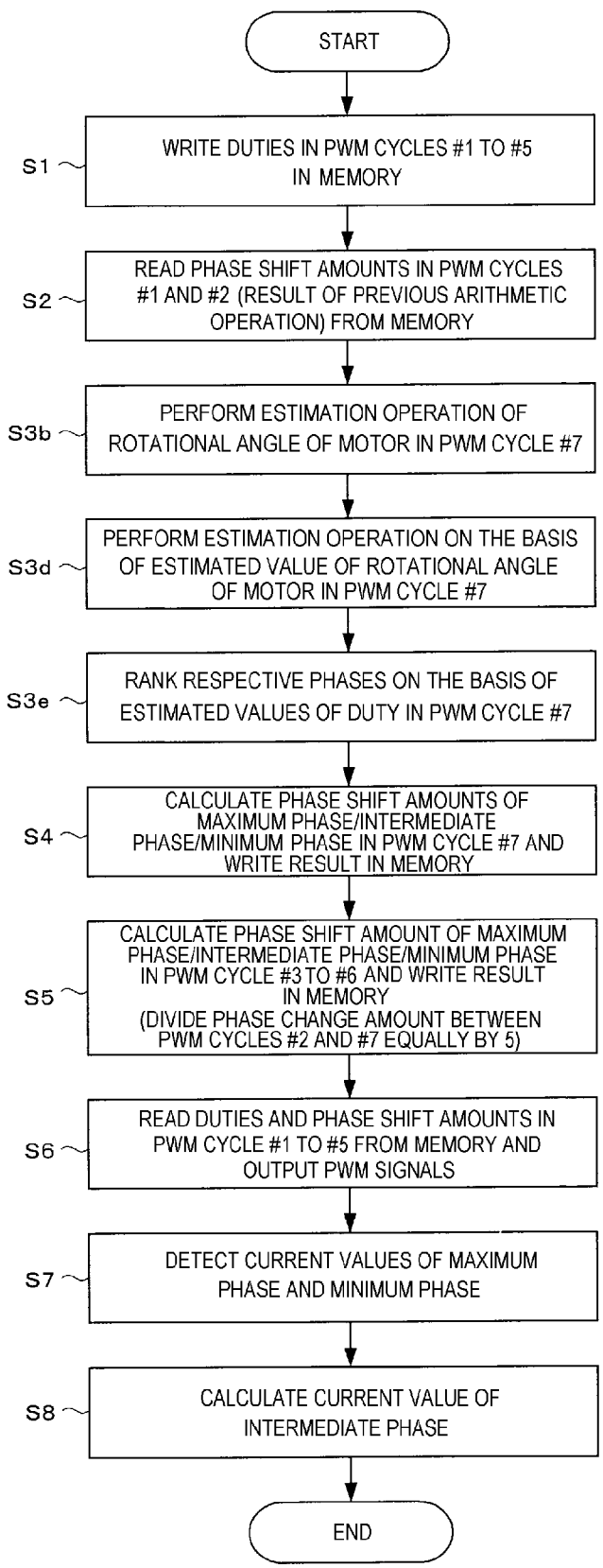
FIG. 9 is a flowchart illustrating still another example of phase shifting.

FIG. 9 is a flowchart illustrating a procedure of phase shifting in a case where the fourth method is employed. In FIG. 9, Step S3 in FIG. 4 is replaced by Step S3b, Step S3d, and Step S3e. Step S3b is the same as Step S3b in FIG. 8, and here the estimated value of the rotational angle of the motor 6 in the PWM cycle #7 is calculated by using the arithmetic expression described above.

In Step S3d, an estimation operation of the duties in the PWM cycle #7 is performed on the basis of the rotational angle of the motor (estimated value) in the PWM cycle #7 calculated by Step S3b. As described in FIG. 2, the duties may be calculated from the target current value, the detected current value, and the rotational angle of the motor, and hence the duty estimated value in the PWM cycle #7 is obtained by using the estimated value calculated in Step S3b as the rotational angle of the motor.

In Step S3e, ranking is performed for the duties (estimated values) in the respective phases in the PWM cycle #7 calculated in Step S3d. In Step S4, the phase shift amounts in the maximum phase, the intermediate phase, and the minimum phase in the PWM cycle #7 are calculated from the result of the ranking in Step S3e, and the respective phase shift amounts are written in the memory 4. Since Steps S1 to S2, and S5 to S8 are the same as the case in FIG. 4, description will be omitted.

Various embodiments other than those described above are within a scope of the invention. For example, in FIG. 3, the phases of the PWM signals are gradually shifted after the entry into the control cycle (n+2) However, the phases of the PWM signals may be shifted gradually from immediately after detection of the currents in the current detection term of the control cycle (n+1) In this case, the PWM signals of the duties D(n) are generated and output before the current detection described above.

In one or more of the embodiments described above, the phases of the PWM signals are shifted directly by the phase shift unit 16. However, the phases of the phases of the PWM signals may be shifted as a consequence by shifting the phases of the carrier signals generated for the respective phases. In this case, in FIG. 2, the phase shift unit 16 may be provided between the carrier signal generating unit 11 and the PWM signal generating unit 13.

As regards the phase shifting, the intermediate phase and the minimum phase are shifted by a predetermined amount that allows detection of the current with reference to the maximum phase in the example illustrated in FIG. 12. However, the invention is not limited thereto. For example, as described also in JP-A-2010-279141, the maximum phase and the minimum phase may be shifted by a predetermined amount that allows detection of the current with respect to the intermediate phase, or the maximum phase and the intermediate phase may be shifted by a predetermined amount that allows detection of the current with respect to the minimum phase.

Although the control apparatus for the 3-phase motor has been described in one or more of the embodiments described above, the invention is not limited to the 3-phase motor, and may be applied to the control apparatus for multi-phase motors having four phases or more. In this case, a plurality of pairs of upper and lower arms is provided in the inverter circuit 2 in accordance with the number of phases.

Although the FET has been exemplified as the switching elements Q1 to Q6 of the inverter circuit 2 in one or more of the embodiments described above, other types of switching elements such as IGBT (Insulated Gate Bipolar Transistor) may be used.

Although the brushless motor has been exemplified as the motor 6 in one or more of the embodiments described above, one or more embodiments of the invention may be applied to cases where other types of motors are controlled.

Moreover, although the motor control apparatus used in electric power steering apparatus for vehicles has been exemplified, one or more embodiments of the invention may be applied to the motor control apparatus to be used in other apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor control apparatus comprising:
   an inverter circuit comprising:
      a plurality of pairs of upper and lower arms provided so as to correspond to a number of phases, and
      switching elements provided on each of the upper arms and the lower arms of each phase that drive a motor on the basis of ON or OFF operations of the respective switching elements;
   a single current detector that detects a current of the motor flowing through the inverter circuit;
   a duty calculator that calculates duties of PWM signals for turning the switching elements ON or OFF on the basis of a deviation between a current value of the current detected by the current detector and a target current value;
   a PWM signal generator that generates a plurality of PWM signals corresponding to a plurality of PWM cycles for respective phases within one control cycle comprising the plurality of PWM cycles on the basis of the duties calculated by the duty calculator, and outputs the PWM signals to the switching elements respectively; and
   a phase shift unit that shifts the phases of the PWM signals generated by the PWM signal generator gradually within one control cycle,
   wherein the PWM signal generator generates and outputs PWM signals comprising calculated duties after the duty calculator calculates the duties of the PWM signals in the respective phases before the phase shift unit starts phase shifting.

2. The motor control apparatus according to claim 1, wherein the PWM signal generator generates and outputs PWM signals comprising calculated duties in an n+1th control cycle after the duty calculator calculates the duties of the PWM signals in the respective phases on the basis of the currents detected by the current detector in an nth control cycle, and the phase shift unit shifts the phases of the PWM signals gradually in an n+2th control cycle.

3. The motor control apparatus according to claim 2, wherein the phase shift unit calculates phase shift amounts in the respective phases in the last PWM cycle in the n+2th control cycle on the basis of a result of ranking of the duties in the respective phases in a predetermined PWM cycle in the n+2th control cycle calculated by the duty calculator, and shifts the phases of the PWM signals gradually in the n+2th control cycle on the basis of the phase shift amounts.

4. The motor control apparatus according to claim 3, wherein the PWM signal generator generates and outputs PWM signals comprising duties calculated by the duty calculator in the n+1th control cycle before the current detector detects the currents.

5. The motor control apparatus according to claim 3, wherein the PWM signal generator generates and outputs PWM signals comprising duties calculated by the duty calculator immediately after the calculation of the duties in the n+1th control cycle.

6. The motor control apparatus according to claim 2, further comprising
   a rotational angle detector that detects a rotational angle of the motor,
   wherein the phase shift unit calculates the phase shift amounts of the respective phases in the last PWM cycle in the n+2th control cycle on the basis of a relationship between the rotational angle of the motor acquired from the rotational angle detector and the duties in the respective phases, and shifts the phase of the PWM signals gradually in the n+2th control cycle on the basis of the phase shift amounts.

7. The motor control apparatus according to claim 6, wherein the PWM signal generator generates and outputs PWM signals comprising duties calculated by the duty calculator in the n+1th control cycle before the current detector detects the currents.

8. The motor control apparatus according to claim 6, wherein the PWM signal generator generates and outputs PWM signals comprising duties calculated by the duty calculator immediately after the calculation of the duties in the n+1th control cycle.

9. The motor control apparatus according to claim 2, further comprising:
   a rotational angle detector that detects a rotational angle of the motor,
   wherein the phase shift unit operates an estimated value of the rotational angle of the motor in the last PWM cycle in the n+2th control cycle on the basis of the rotational angle of the motor acquired from the rotational angle detector, calculates the phase shift amounts in the respective phases in the last PWM cycle in the n+2th control cycle on the basis of a relationship between the estimated value of the rotational angle and the duties in the respective phases, and shifts the phases of the PWM signals gradually in the n+2th control cycle on the basis of the phase shift amounts.

10. The motor control apparatus according to claim 9, wherein the PWM signal generator generates and outputs PWM signals comprising duties calculated by the duty calculator in the n+1th control cycle before the current detector detects the currents.

11. The motor control apparatus according to claim 9, wherein the PWM signal generator generates and outputs PWM signals comprising duties calculated by the duty calculator immediately after the calculation of the duties in the n+1th control cycle.

12. The motor control apparatus according to claim 2, further comprising:
a rotational angle detector that detects a rotational angle of the motor,
wherein the phase shift unit operates an estimated value of the rotational angle of the motor in the last PWM cycle in the n+2th control cycle on the basis of the rotational angle of the motor acquired from the rotational angle detector, operates estimated values of the duties in the respective phases in the last PWM cycle in the n+2th control cycle on the basis of the estimated value of the rotational angle, calculates the phase shift amounts in the respective phases in the last PWM cycle in the n+2th control cycle on the basis of a result of ranking of the estimated values of the duties in the respective phases, and shifts the phases of the PWM signals gradually in the n+2th control cycle on the basis of the phase shift amounts.

13. The motor control apparatus according to claim 12, wherein the PWM signal generator generates and outputs PWM signals comprising duties calculated by the duty calculator in the n+1th control cycle before the current detector detects the currents.

14. The motor control apparatus according to claim 12, wherein the PWM signal generator generates and outputs PWM signals comprising duties calculated by the duty calculator immediately after the calculation of the duties in the n+1th control cycle.

15. The motor control apparatus according to claim 2, wherein the PWM signal generator generates and outputs PWM signals comprising duties calculated by the duty calculator in the n+1th control cycle before the current detector detects the currents.

16. The motor control apparatus according to claim 2, wherein the PWM signal generator generates and outputs PWM signals comprising duties calculated by the duty calculator immediately after the calculation of the duties in the n+1th control cycle.

17. The motor control apparatus according to claim 1, wherein the PWM signal generator generates and outputs PWM signals comprising calculated duties in a n+1th control cycle after the duty calculator calculates the duties of the PWM signals in the respective phases on the basis of the currents detected by the current detector before the current detector detects the currents in the nth control cycle, and the phase shift unit shifts the phases of the PWM signals gradually from immediately after the current detector detects the currents in a n+1th control cycle.

* * * * *